United States Patent
Okajima et al.

(10) Patent No.: US 6,606,555 B2
(45) Date of Patent: Aug. 12, 2003

(54) VEHICLE POSITIONING APPARATUS, DEVICE, AND METHOD

(75) Inventors: Hiroaki Okajima, Chiba (JP); Akira Shinada, Tokyo (JP); Katsuhiko Nunokawa, Kanagawa (JP); Makoto Sasaki, Chiba (JP); Seiichi Tsunoda, Nissin (JP)

(73) Assignees: Sony Corporation, Tokyo (JP); Toyota Jidosha Kabushiki Kaisha, Aichiken (JP)

( * ) Notice: Subject to any disclaimer, the term of this patent is extended or adjusted under 35 U.S.C. 154(b) by 0 days.

(21) Appl. No.: 10/021,866

(22) Filed: Dec. 17, 2001

(65) Prior Publication Data

US 2002/0091484 A1 Jul. 11, 2002

(30) Foreign Application Priority Data

Dec. 22, 2000 (JP) .................... P2000-395043

(51) Int. Cl.[7] .............................. G01C 21/26
(52) U.S. Cl. ................. 701/207; 701/211; 340/988
(58) Field of Search ................. 701/207, 211, 701/216; 180/287; 340/425.5, 988, 989, 996; 455/92, 95

(56) References Cited

U.S. PATENT DOCUMENTS

| 6,034,617 | A | * | 3/2000 | Luebke et al. ............. 340/5.62 |
| 6,164,403 | A | * | 12/2000 | Wuidart ....................... 180/287 |
| 6,169,943 | B1 | * | 1/2001 | Simon et al. ................. 701/29 |
| 6,405,125 | B1 | * | 6/2002 | Ayed ........................... 701/200 |

FOREIGN PATENT DOCUMENTS

| JP | 11142512 | * | 5/1999 | ............ G01S/13/04 |
| JP | 2000-280864 | * | 10/2000 | ............ B60R/25/00 |

* cited by examiner

*Primary Examiner*—Marthe Y. Marc-Coleman
(74) *Attorney, Agent, or Firm*—Jay H. Maioli

(57) ABSTRACT

A car positioning system that permits a user to easily position a car with security. Information necessary for locating the car is sent from the car by authentication of the user at a terminal unit, and received by a terminal unit which sends positional information about the car to the user. Also, in response to an access made by the terminal unit having a unique identification code via a public telephone network, positional information about the car is sent from a main unit installed in the car to the terminal unit.

5 Claims, 14 Drawing Sheets

VEHICLE POSITIONING APPARATUS, DEVICE, AND METHOD

BACKGROUND OF THE INVENTION

1. Field of the Invention

The present invention relates to a vehicle positioning apparatus and method, and more particularly, to a vehicle positioning apparatus and method in which information necessary for positioning a vehicle is sent from the vehicle after successful authentication of the vehicle and received by the terminal unit to give the user positional information about the vehicle and also positional information about a vehicle is sent to a terminal unit from a device installed on board in a vehicle in response to an access made from the terminal unit having a peculiar ID code assigned thereto via a public telephone network, thereby permitting to position a vehicle simply and easily while assuring a sufficient security thereof.

2. Description of the Related Art

Heretofore, various car positioning methods have been proposed to permit car users to easily position their cars parked in any very wide parking lots.

Some typical examples of such methods will be considered below. One of them is to turn on the light of a user's car or sound the car horn in response to operation of a remote controller by the user. The other is to use a portable GPS (global positioning system) (as disclosed in the Japanese Published Unexamined Application No. 84092-1994).

However, the above conventional car positioning methods have problems to solve for practical use.

That is, the car positioning method by car light illumination or car horn sounding will disturb the neighbors in some cases and cannot position the car depending on the structure or scale of the parking lot.

Also, the conventional portable GPS systems are large and their operations will bother the users very much. In any case, if the user lost or misses his own portable device such as the remote controller, anyone having found the lost portable terminal may possibly use the portable device to position the car, which will compromise the car security.

OBJECT AND SUMMARY OF THE INVENTION

It is therefore an object of the present invention to overcome the above-mentioned drawbacks of the prior art by providing a vehicle positioning apparatus and method for positioning a vehicle simply and easily while assuring a high security thereof.

According to a first aspect of the present invention as defined in claim 1 which will be set forth later, there is provided a vehicle positioning apparatus which can be carried on by a user, including an authentication means for authenticating the user to provide a result of authentication, a remote controlling means for requesting a predetermined main unit to send information necessary for finding a vehicle of the user, a receiving means for receiving the necessary information for finding the vehicle, and a providing means for providing positional information about the vehicle to the user, according to the necessary information for finding the vehicle received by the receiving means.

As in the above, the vehicle positioning apparatus is simply constructed to assure easy positioning of the user's vehicle with a sufficient security by providing only the correctly authenticated user with the positional information from the main unit.

According to the second aspect of the present invention as defined in claim 6, there is provided a vehicle positioning method including the steps of authenticating a user by a terminal unit carried on by the user to provide a result of authentication, requesting a predetermined main unit to send information necessary for positioning a vehicle of the user, and receiving the necessary information for positioning the vehicle and providing positional information about the vehicle to the user.

As in the above, the vehicle positioning method is very simple and permits to easily locate the user's car with a sufficient security.

According to the third aspect of the present invention as defined in claim 7, there is provided a vehicle positioning device installed on board in a vehicle to send positional information about the vehicle to a terminal unit having a particular Identification code assigned thereto in response to an access made from the terminal unit via a public telephone network.

In the vehicle positioning apparatus, the positional information about the user's vehicle can be served only in response to an access from an authorized terminal unit such as an authorized user's mobile telephone. Thus, the vehicle positioning apparatus simply constructed as in the above assures to easily locate the user's vehicle with a sufficient security.

According to the fourth aspect of the present invention as defined in claim 10, there is provided a vehicle positioning method in which in response to an access made from a terminal unit having a peculiar Identification code assigned thereto via a public telephone network, positional information about a vehicle is sent from a device installed on board in the vehicle to the terminal unit. In the vehicle positioning method, easy location of the user's vehicle can be assured with a sufficient security.

These objects and other objects, features and advantages of the present invention will become more apparent from the following detailed description of the preferred embodiments of the present invention when taken in conjunction with the accompanying drawings.

Figure 2:
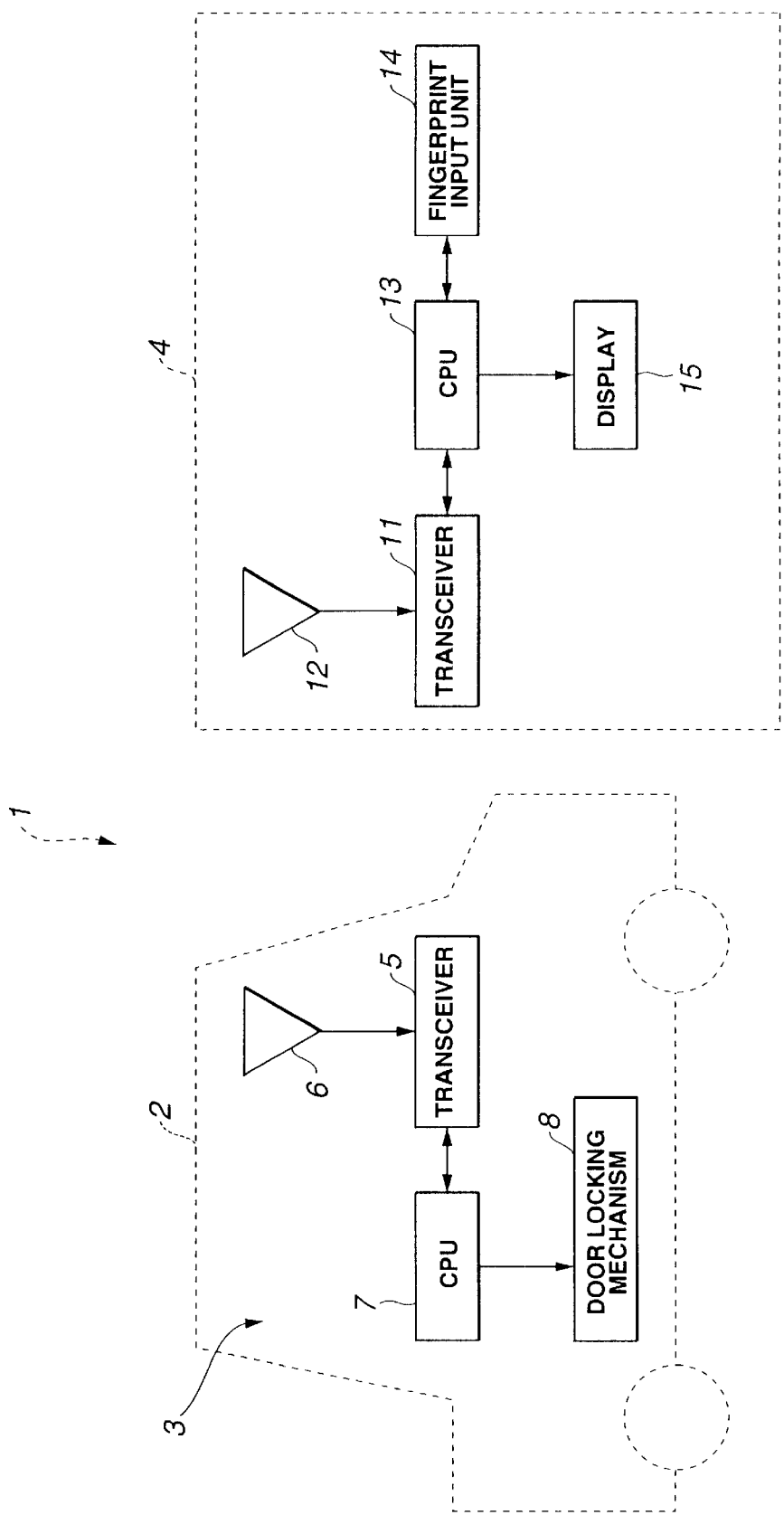
FIG. 2 is a block diagram of a vehicle positioning system which comprises the vehicle positioning apparatus using the CPU in FIG. 1 and a main unit in the vehicle.

DETAILED DESCRIPTION OF THE PREFERRED EMBODIMENTS (1) First Embodiment
(1-1) Structure of First Embodiment Referring now to FIG. 2, there is schematically illustrated in the form of a block diagram the first embodiment of the car positioning system according to the present invention. The car positioning system is generally indicated with a reference 1. As shown, the car positioning system 1 includes mainly a main unit 3 installed on board in a car 2 and a terminal unit 4 carried on by the user. Upon request from the terminal unit 4, the main unit 3 sends a radio guide wave being a marker which guides the terminal unit 4 to the car 2, and unlocks the door of the car 2. In this case, the terminal unit 4 authenticates the user, requests, depending upon the result of user authentication, the main unit 3 to send the radio guide wave, and displays the result of radio guide wave reception to guide the user for being close to the car 2. Note that the radio guide wave is a carrier signal of a single frequency and whose amplitude is kept constant.

Figure 8:
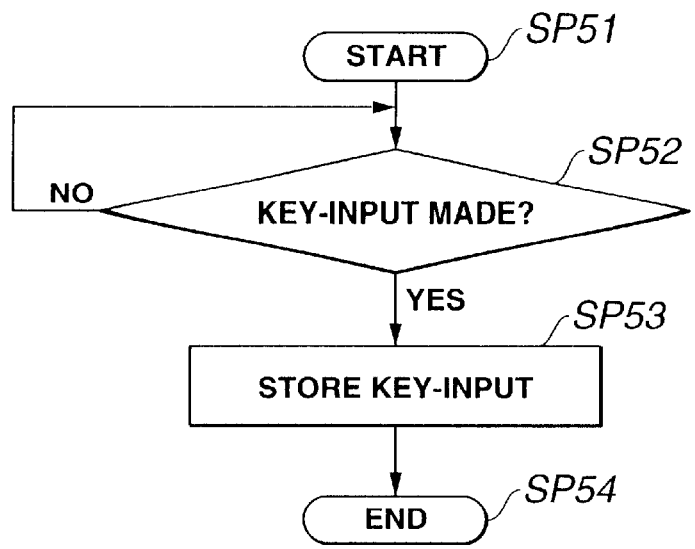
FIG. 8 shows a flow of operations made by a CPU provided in a terminal unit of the vehicle positioning system shown in FIG. 7 when the user parks his or her car in a parking lot.

More particularly, the main unit 3 includes a transceiver circuit 5, antenna 6, central processing unit (CPU) 7, and a door locking mechanism 8 as shown in FIG. 8. By processing radio communication wave received by the antenna 6 to receive a radio guide wave sending request and door unlocking request sent from the terminal unit 4, the transceiver circuit 5 and send the data to the CPU 7. Also, the transceiver circuit 5 is controlled by the CPU 7 to send a radio guide wave at the antenna 6. The door locking mechanism 8 is controlled by the CPU 7 to lock or unlock the car door.

Figure 3:
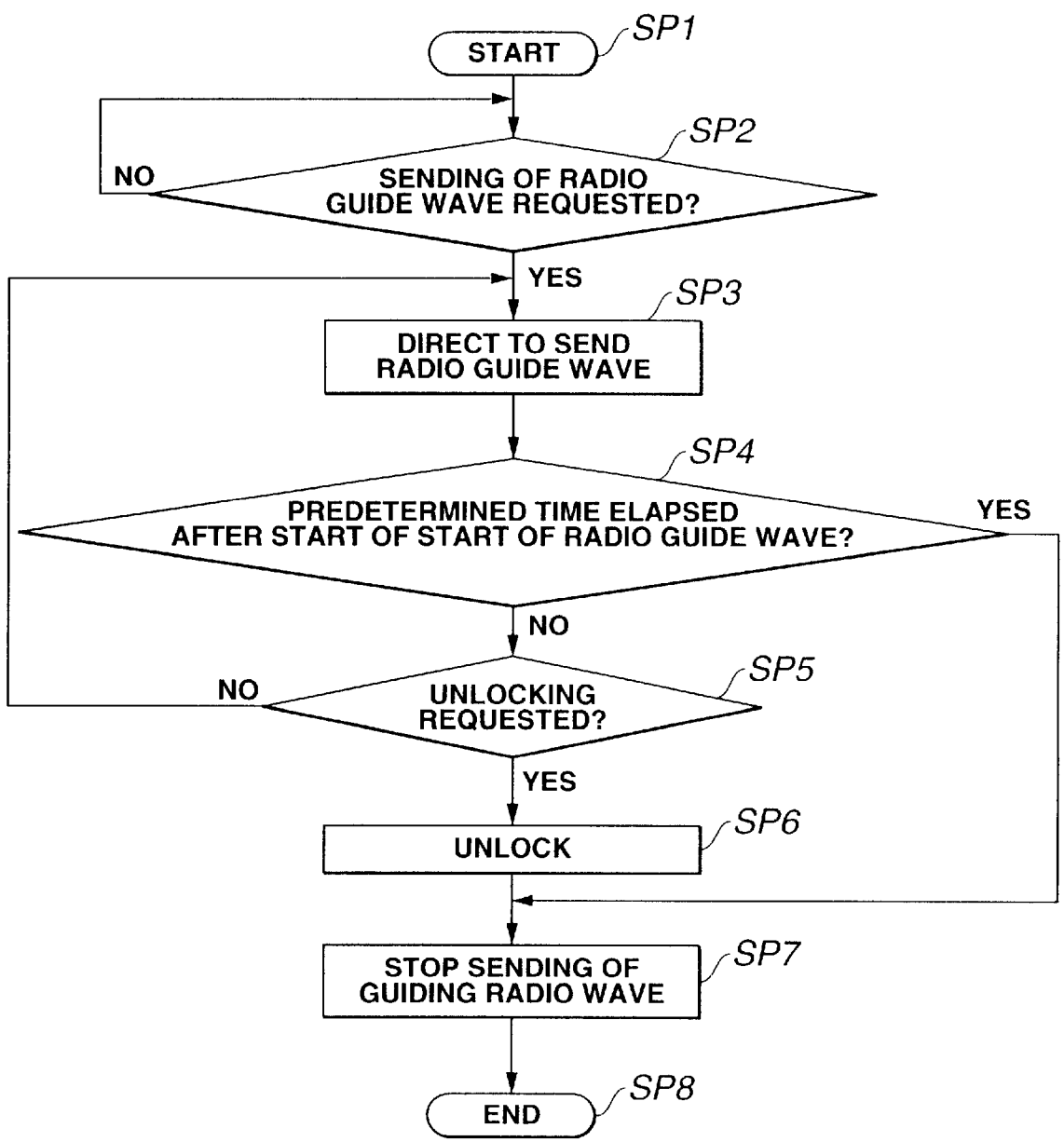
FIG. 3 shows a flow of operations made by a CPU provided in a terminal unit of the vehicle positioning system shown in FIG. 2.

The CPU 7 controls the operations of the main unit 3. When the user locks the door of his car, the CPU 7 will do the procedure as shown in FIG. 3. The CPU 7 starts the procedure in step SP1 and then moves to SP2 where it will judge, based on information from the transceiver circuit 5, whether a request for sending of a radio guide wave has arrived from the terminal unit 4. If the result of judgment is negative (NO), the CPU 7 will repeat the judgment in step SP2. On the other hand, if the result of judgment is affirmative (YES), the CPU 7 moves to step SP3 where it will instruct the transceiver circuit 5 to send a radio guide wave.

Next, the CPU 7 moves to step SP4 where it will judge whether a predetermined time has elapsed from the instruction for sending of the radio guide wave. If the result of judgment is negative, the CPU 7 moves to step SP5 where it will judge whether a request for unlocking the door of the user's car has arrived from the terminal unit 4 via the transceiver circuit 5. If the result of judgment is negative, the CPU 7 will return to step SP3.

On the other hand, if the result of the judgment made in step SP5 is affirmative, the CPU 7 moves to step SP6 where it will instruct the door locking mechanism 8 to unlock the user's car door. Then, the CPU 7 moves to step SP7 where ti will instruct the transceiver circuit 5 to stop sending the radio guide wave, and then moves to step SP8 to exit this procedure.

However, if no request for unlocking the car door has arrived even when the predetermined time has elapsed after the sending of the radio guide wave is started, the CPU 7 moves, because of the negative result of judgment in step SP4, to step SP7 where it will instruct the transceiver circuit 5 to stop sending the radio guide wave.

As shown in FIG. 2, the terminal unit 4 includes a transceiver circuit 11 and antenna 12. The antenna receives a radio guide wave sent from the main unit 3 and sends radio guide wave sending request and unlocking request outputs of the transceiver circuit 11. The antenna 12 is composed of a plurality of antennas to detect the direct the coming direction of a radio guide wave by applying the diversity reception to process the received radio guide wave. Thus, the car positioning system 1 can detect the direction toward the user's car by processing the radio guide wave received by the antenna 12.

The transceiver circuit 11 detects signal level and phase of a radio guide wave received by the antenna 12 and provides the result of detection to a central processing unit (CPU) 13 also provided in the main unit 4. Also, the transceiver circuit 11 is controlled by the CPU 13 to send a request for sending a radio guide wave and door unlocking request from the antenna 12.

The terminal unit 4 further includes a fingerprint input unit 14 having a specific fingerprint sensor. When the output signal from the fingerprint sensor varies, the fingerprint input unit 14 is activated to output image data on a fingerprint as a result of fingerprint detection by the fingerprint sensor. At this time, the fingerprint input unit 14 outputs, to the CPU 13, the image data along with a result of detection from a specific living-body detecting mechanism. The living-body detecting mechanism is composed of a pressure sensor for example and can process output signals to judge whether an object placed on the fingerprint sensor is a human body or not. Note that in case the living-body detecting mechanism is the pressure sensor, it judges whether the object placed on the fingerprint sensor is a human body or not, through judgment of whether a change in pressure due to a blood pulsation can be detected in the object.

The terminal unit 4 also includes a display unit 15 which is controlled by the CPU 13 to display various kinds of information necessary for operation of the terminal unit 4. The display unit 15 displays a coming direction of the radio guide wave. Thus, the car positioning system 1 permits the user to move along the direction displayed on the display unit 15 from the current position to a place where his car 2 is parked.

The CPU 13 is provided to control the operations of the terminal unit 4. When the user operates a control (not shown) provided on the terminal unit 4, the CPU 13 is started up in step SP11 and executes a procedure shown in the flow chart shown in FIG. 1. As shown, the CPU 13 then moves to step SP12 where it will judge whether image data on the fingerprint of the user has been entered from the fingerprint input unit 14. If the result of judgment is negative, the CPU 13 will repeat the judgment in step SP12. On the other hand, if the result of judgment is affirmative, the CPU 13 moves to step SP13 where it will make a fingerprint collation based on the fingerprint image data entered from the fingerprint input unit 14. By this fingerprint collation, the CPU 13 judges whether the terminal unit 4 has been operated by an already registered user. Further, the CPU 13 will judge, based on the result of detection from the living-body detecting mechanism, namely, the data supplied from the fingerprint input unit 14, whether the fingerprint image data have been generated by a human body. Thus, the terminal unit 4 makes a user authentication based on a physical feature different from one user to another in order to assure an improved security. Namely, the fingerprint input unit 14 and CPU 13 form together an authentication means to authenticate a user and provide a result of authentication.

If the result of judgment from step SP13 is negative, the CPU 13 moves to step SP19 where it will judge whether the user passes the authentication more than a predetermined number of times (3 times in this embodiment). If the result of judgment is negative from step SP19 is negative, the CPU 13 returns to step SP12. On the other hand, if the result of judgment is affirmative, the CPU 13 moves to step SP 14 where it will drive the transceiver circuit 11 to output a request for sending a radio guide wave to the main unit 3, and then moves to step SP 15. Namely, the CPU 13 and transceiver circuit 11 form together a remote controlling means for requesting, in response to the result of authentication from the authenticating means, the main unit 3 to send necessary information for locating the user's car. In step SP15, the CPU 13 judges, based on the result of processing from the transceiver circuit 11, whether the radio guide wave has successfully been received. If the result of this judgment is negative, the CPU 13 returns to step SP14.

On the other hand, if the result of judgment from step SP15 is positive, the CPU 13 moves to step SP16 where it will judge, based on the result of processing from the transceiver circuit 11, whether the radio guide wave has successfully been received at a sufficient level, and thus whether the user has sufficiently been close to the main unit 3, namely, his car. If the result of judgment is negative, the CPU 13 moves to step SP17 where it will control the display unit 15 to display the coming direction of the radio guide wave, and then returns to step SP15. On the other hand, if the result of judgment from step SP16 is affirmative, the CPU 13 moves to step SP18 where it will control the transceiver circuit 11 to send a request for unlocking the car door to the main unit 3, and then moves to step SP19 where it will exit this procedure.

(1-2) Operation of First Embodiment

The car positioning system 1 constructed as in the above will function as will be described herebelow. When the user parks his car 2 and locks the car door, the main unit 3 installed on board in the car 2 starts a standby mode of operation and waits for a request for sending a radio guide wave from the terminal unit 4 (as having been described above with reference to FIG. 3). When the user going back to the car 2 operates the predetermined control on the terminal unit 4 and then places the finger on the fingerprint sensor of the fingerprint input unit 14, he is authenticated by the terminal unit 4 and the living-body detection is carried out to identify the user (as having been described above with reference to FIG. 1). Only when the user is successfully identified, the request for sending of a radio guide wave is sent from the terminal unit 4 to the main unit 3. Thus, the car positioning system 1 can locate the user's car with a considerably higher security than ever.

In the car positioning system 1, upon request for sending of radio guide wave, the main unit 3 sends a radio guide wave to the terminal unit 4. The radio guide wave is received by the terminal unit 4 to detect the coming direction of the radio wave. Further, the direction toward the car 2, based on the result of detection by the terminal unit 4, is displayed on the display unit 15. Thus, even if the user has forgotten the place where he parked his car 2 or in a similar case, the user can be guided by the display to go toward his car 2 and finally find it. Namely, the car positioning system 1 is simply constructed to detect, at the terminal unit 4, only a marker sent from the main unit 3. Further, with this car positioning system 1, it is possible to avoid car horn sounding or car light illumination which will disturb the neighbors very much.

As the user has been close to the car 2 as in the above and when the signal level of the radio guide wave received by the terminal unit 4 becomes higher than predetermined, the terminal unit 4 instructs the main unit 3 to unlock the car door which will thus be unlocked by the door locking mechanism 8. In this way, the car positioning system 1 can unlock the car door without opening it with the key at each time, which assures an improved user's convenience.

When no door unlocking request arrives at the main unit 3 even when the predetermined time has elapsed after starting to send a radio guide wave, the main unit stops sending the radio guide wave. Thus, even when the user ceases going back to his car 2, when the user has made a maloperation of his terminal unit 4 or when any third person has made any fraudulence, the car positioning system 1 can assure an improved security against such events.

(1-3) Effect of First Embodiment

As having been described in the foregoing, the car positioning system is simply constructed to authenticate the user by the fingerprint collation, send a request for sending a radio guide wave being necessary information for locating a user's car, process the radio guide wave sent in response to the request, and inform the user of the direction toward his car, but it can assure easy location of the car with a full security.

Also, being close to the car can be detected based on the radio guide wave, to unlock the car door, which will improve the user's convenience.

(2) Second Embodiment

Figure 1:
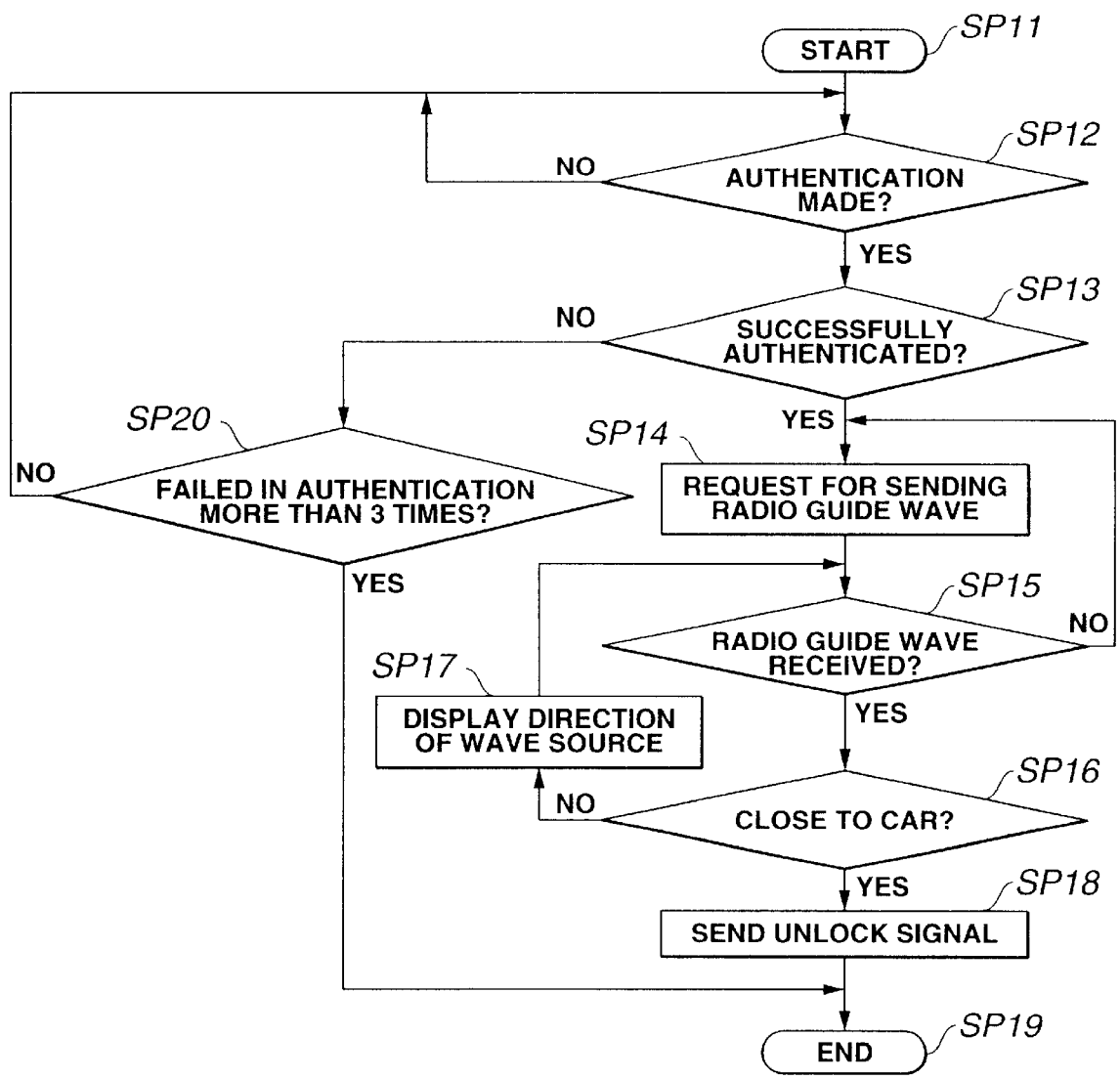
FIG. 1 shows a flow of operations made by a central processing unit (CPU) provided in a main unit of the vehicle positioning apparatus according to the first aspect of the present invention.
Figure 4:
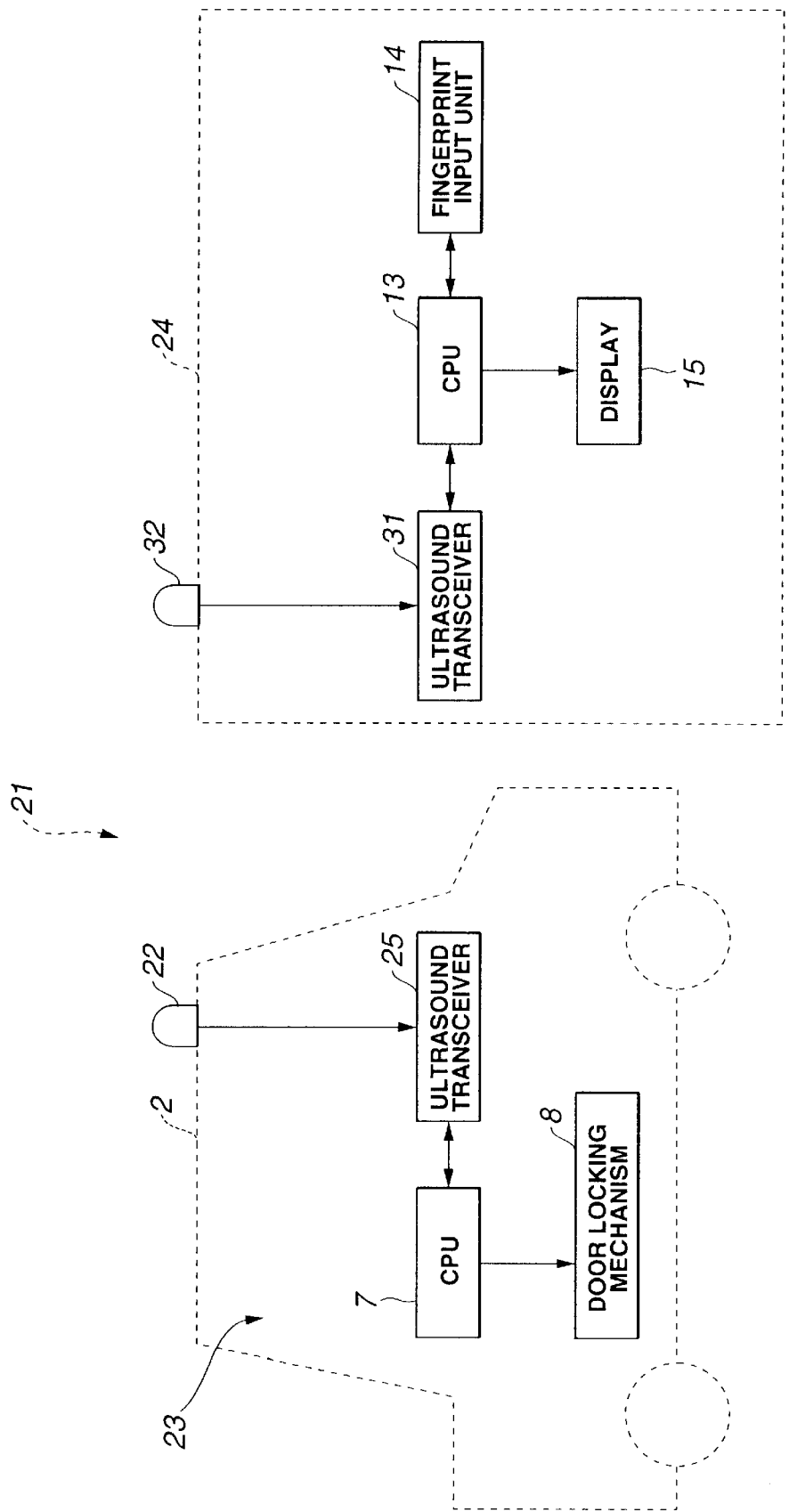
FIG. 4 is a block diagram of the vehicle positioning system according to the second aspect of the present invention.

Referring now to FIG. 4, there is schematically illustrated in the form of a block diagram the second embodiment of the car positioning system according to the present invention. This car positioning system is generally indicated with a reference 21. In the car positioning system 21, an ultrasound or ultrasonic wave is used as a guide wave and for sending a guide wave sending request and car door unlocking request. That is, the car positioning system 21 is constructed similarly to the aforementioned car positioning system 1 except for the use of ultrasound in place the radio wave. Note that in FIG. 4, the same or similar elements as in FIG. 1 are indicated with the same references as in FIG. 1.

As shown in FIG. 4, the car positioning system 21 includes a main unit 23 installed on board in a car 2 and a terminal unit 24. The main unit 23 includes a CPU 7 and door locking mechanism 8, a transmission/reception mechanism 22 consisting of a combination microphone/speaker and an ultrasound transceiver circuit 25. The ultrasound transceiver circuit 25 processes output signals from the transmission/reception mechanism 22 to receive a request for sending of a guiding ultrasound and request for car door unlocking, and provide the requests to the CPU 7. The transmission/reception mechanism 22 is driven under the control of the CPU 7 to send a guiding ultrasound or ultrasonic wave.

Figure 5:
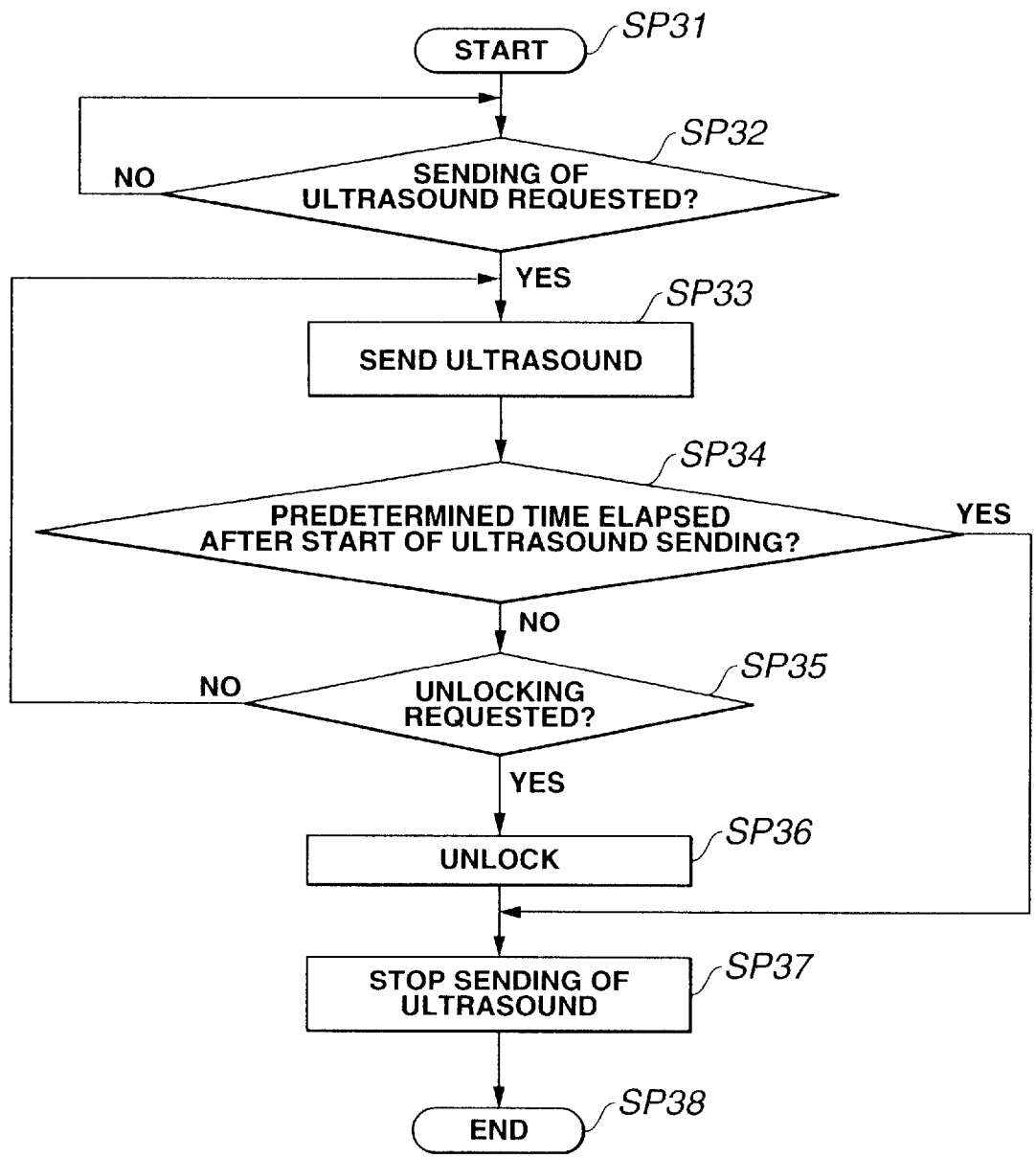
FIG. 5 show a flow of operations made by a CPU provided in the main unit of the vehicle positioning system shown in FIG. 4.

Thus, in the main unit 23, the CPU 7 executes a procedure shown in FIG. 5 (similar to FIG. 3) to send a guiding ultrasound and unlock the car door.

The terminal unit 24 includes a CPU 13, fingerprint input unit 14 and display unit 15, an ultrasound transceiver circuit 31 and a transmission/reception mechanism 32 consisting of a combination microphone/speaker. With the transmission/reception mechanism 32 driven by the CPU 13, the ultrasound transceiver circuit 31 sends a request for sending of a guiding ultrasound as a guide wave and door unlocking request. Also, the ultrasound transceiver circuit 31 processes output signals from the transmission/reception mechanism 32, digitizes the intensity of the received guide wave and outputs the data to the CPU 13.

Figure 6:
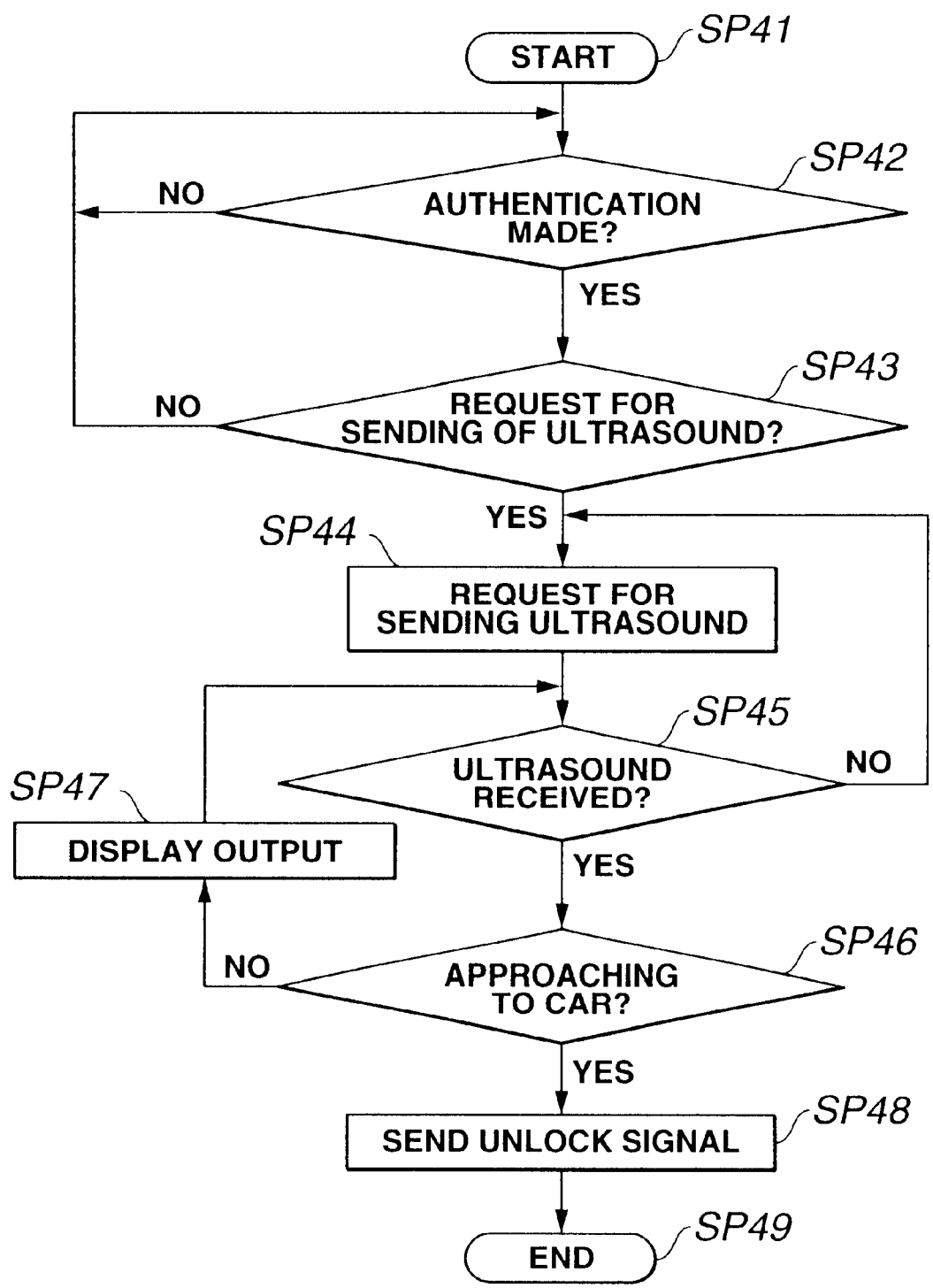
FIG. 6 shows a flow of operations made by the CPU in the terminal unit of the vehicle positioning system shown in FIG. 4.

Thus, the CPU 13 executes a procedure shown in FIG. 6 (similar to FIG. 1) to display the digital value on the display unit 15 and send a predetermined sound to the user. The terminal unit 24 is turned in various directions to detect a direction in which the strongest guide wave can be picked up, thereby permitting to detect a direction toward the car 2 being parked.

The car positioning system 21 is simply constructed, as shown in FIG. 4, to send an ultrasound as a guide wave, and also a request for sending of the guide wave and a request for unlocking the car door, thereby permitting to provide the same effect as the first embodiment having previously been described.

(3) Third Embodiment

Figure 7:
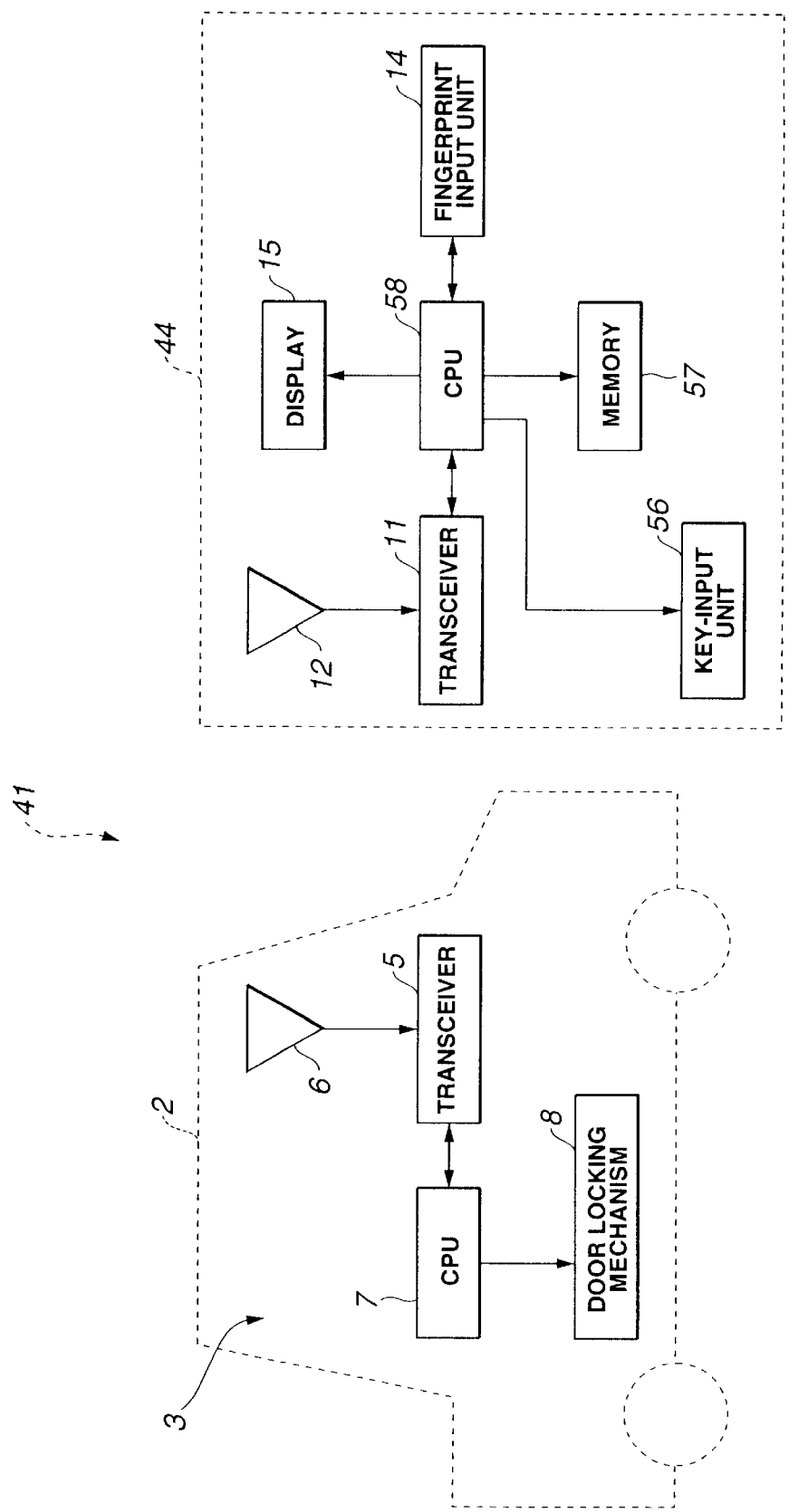
FIG. 7 is a block diagram of the vehicle positioning system according to the fourth aspect of the present invention.

Referring now to FIG. 7, there is schematically illustrated in the form of a block diagram the third embodiment of the car positioning system according to the present invention. This car positioning system is generally indicated with a reference 41. Note that in FIG. 7, the same or similar elements as in FIG. 2 are indicated with the same references as in FIG. 2 and will not be described any further.

This car positioning system 1 includes, in addition to the main unit 3 installed on board in the car 2, a terminal unit 44 which is operated by the user to roughly guide him in locating his car. Thereafter, similarly to the terminal unit 4 included in the first embodiment, the terminal unit 44 receives a radio guide wave from the main unit 3 to further guide the user. Thus, even in a site where the user cannot correctly be guided by any radio wave or ultrasound, such as a parking tower or the like, the user can be roughly guided to a floor where his car 2 is being parked and then the guide wave is used to further guide the user to the car.

More particularly, the terminal unit 44 includes a key-input unit 56 with ten keys or the like. Using the key-input unit 56, the user can enter a number for the floor on which he has parked the car 2, or the like, to the terminal unit 44. The terminal unit 44 includes also a memory 57 to which the floor number or the like entered by the use of the key-input unit 56 is recorded under the control of a CPU 58.

When the terminal unit 44 is operated by the user, the CPU 58 will execute a procedure shown by way of example in FIG. 8 to record the floor number or the like entered from the key-input unit 56 to the memory 57. Namely, when a predetermined control is operated in step SP51, the CPU 58 moves to step SP52 where it will judge whether the predetermined control has been operated after entry of the floor number or the like via the operation of the key-input unit 56. If the result of judgment is negative, the CPU 58 repeats the judgment in step SP52. On the other hand, if the result of judgment is affirmative, the CPU 58 moves to step SP53 where it will record the number entered by the key operation to the memory 57, and then move to step SP54 where it will exit the procedure.

Figure 9:
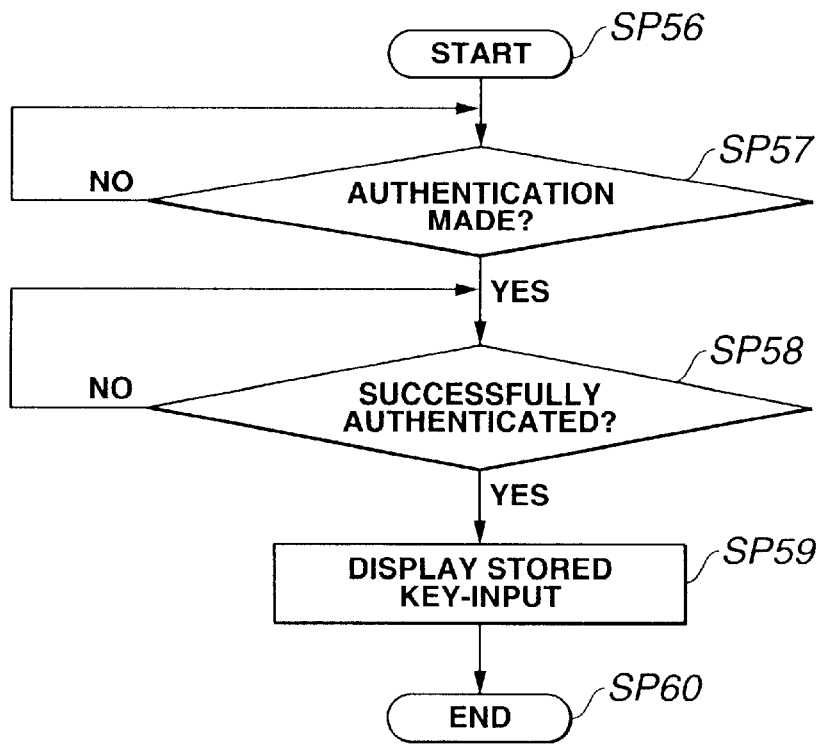
FIG. 9 shows a flow of operations made by the CPU in the terminal unit of the vehicle positioning system shown in FIG. 7 when the user locates his or her car in the parking lot.

FIG. 9 shows a flow of operations made by the CPU 58 in positioning a user's car being parked. When the predetermined control is operated by the user in step SP56, the CPU 58 moves to step SP57 where it will judge whether fingerprint image data have been entered from the fingerprint input unit 14. If the result of judgment is negative, the CPU 58 will repeat the judgment in step SP57. On the other hand, if the result of judgment is affirmative, the CPU 58 moves to step SP58 where it will collate the fingerprint and judge whether the entered fingerprint image data have come from a living body.

When the user is correctly authenticated to be a registered one, the CPU 58 moves to step SP59. However, if the result of judgment from step SP58 is negative, the CPU 58 returns to step SP57. In step SP59, the CPU 58 controls the display unit 15 to display the floor number or the like having been stored in the memory 57, and then moves to step SP60 where it will exit the procedure. The CPU 58 is adapted to inform the user of the floor number or the like having been recorded by the user.

Furthermore, when the user operates the control, the CPU 58 executes the procedure having previously been described with reference to FIG. 1. Thus, in this embodiment, the user can move to the floor under the guidance by the display given via execution of the procedure in FIG. 9 and then operate the terminal unit 44 again for guidance to his car 2 by means of the radio guide wave.

Since in the car positioning system 41 shown in FIG. 7, the terminal unit 44 roughly guides the user to his car 2, the user can have a further improved convenience in locating his car.

(4) Fourth Embodiment

Figure 10:
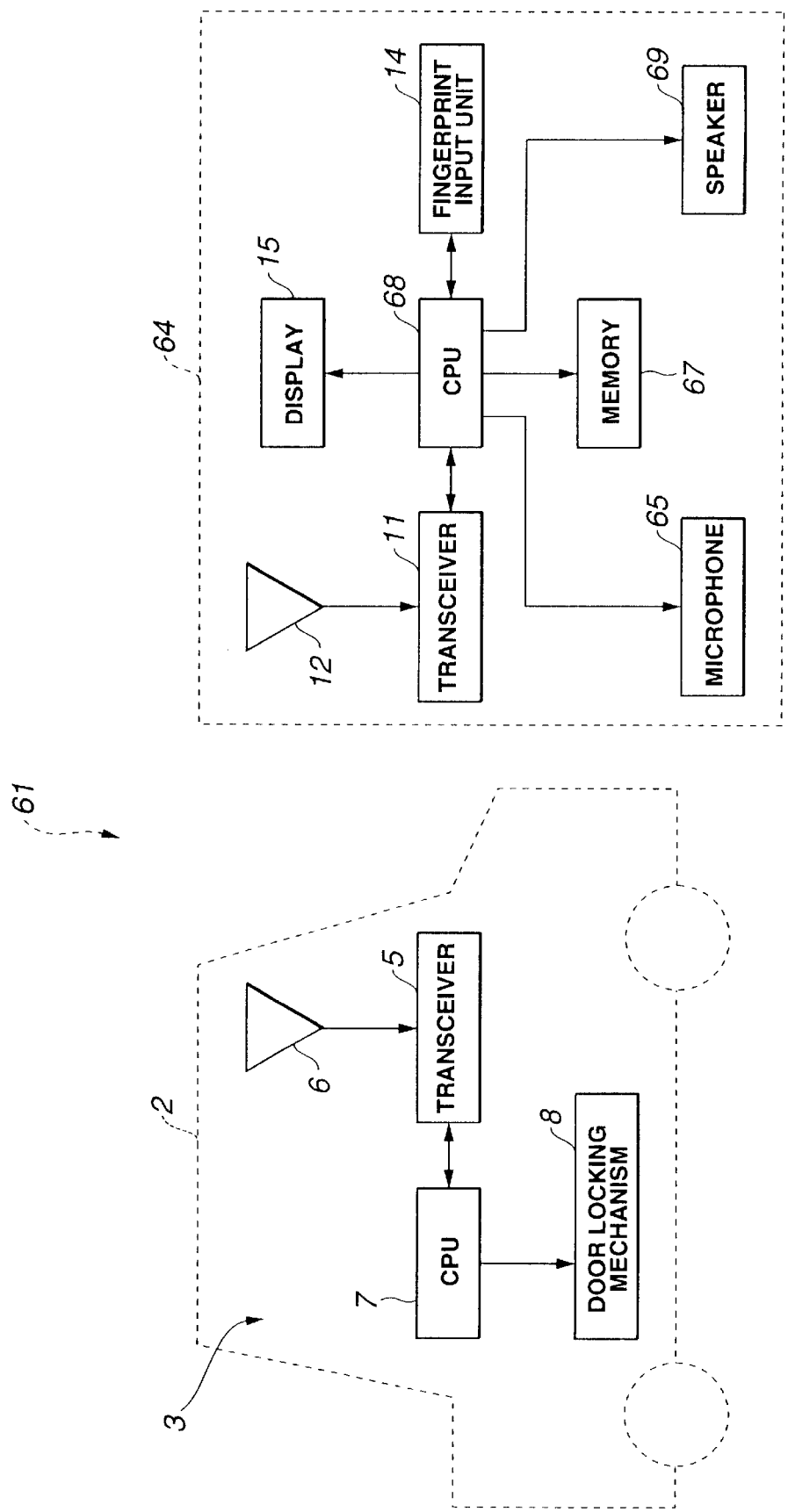
FIG. 10 is a block diagram of the vehicle positioning system according to the fourth aspect of the present invention.

Referring now to FIG. 10, there is schematically illustrated in the form of a block diagram the fourth embodiment of the car positioning system according to the present invention. This car positioning system is generally indicated with a reference 61. Note that in FIG. 10, the same or similar elements are indicated with the same references as in FIG. 7 showing the car positioning system 41 according to the third embodiment of the present invention and will not be described any further.

As shown, the car positioning system 61 includes a terminal unit 64 in addition to the main unit 3 installed on board in the car 2. The terminal unit 64 includes a microphone 65 and speaker 69 in addition to the elements included in the terminal unit 41 in the third embodiment shown in FIG. 7. Namely, the terminal unit 64 is adapted to roughly guide the user to near his car 2 by recording/playback of a voice. Thereafter, the user is further guided to the car 2 by a guide wave sent from the main unit 3 as with the terminal unit 4 in the first embodiment.

More particularly, the microphone 65 in the terminal unit 64 picks up a user's voice and outputs sound signals. The memory 67 records the sound data. The speaker 69 outputs the voice based on the sound data recorded in the memory 67.

When the user operates the terminal unit 64, a CPU 68 in the terminal unit 64 converts the sound signals from the microphone 65 from analog to digital to produce sound data which will be recorded to the memory 67. Also, when the terminal unit 64 is operated in a predetermined manner by the user, the CPU 68 will load the thus recorded sound data from the memory 67, and then converts the sound data from digital to analog to produce sound signals by which the speaker 69 is driven. Thus, the terminal unit 64 is adapted to enter, by utterance, a number for the floor on which the user's car is being parked, feature of the parking place, etc., and guide the user roughly to the car by the entered voices.

Figure 11:
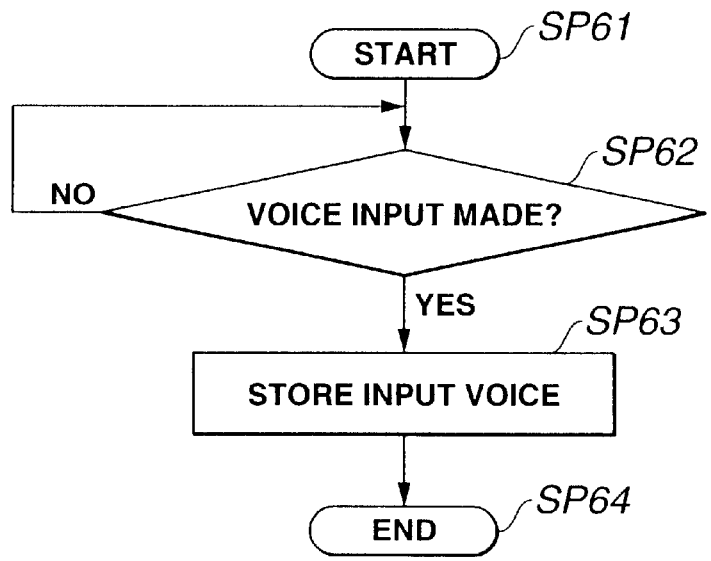
FIG. 11 shows a flow of operations made by a CPU provided in a main unit of the vehicle positioning system shown in FIG. 10 when the user parks his car in a parking lot.

FIG. 11 shows a flow of operations made in a procedure executed by the CPU 68 in entry of voices. When the user operates the terminal unit 64 in step SP61, the CPU 68 moves to step SP62 where it will judge whether voices have been entered to the microphone 65. If the result of judgment is negative, the CPU 68 repeats the judgment in step SP62. On the other hand, if the result of judgment is affirmative, the CPU 68 moves to step SP63 where it will record the sound data about the voice input to the memory 67 and then moves to step SP64 where it will exit the procedure.

Figure 12:
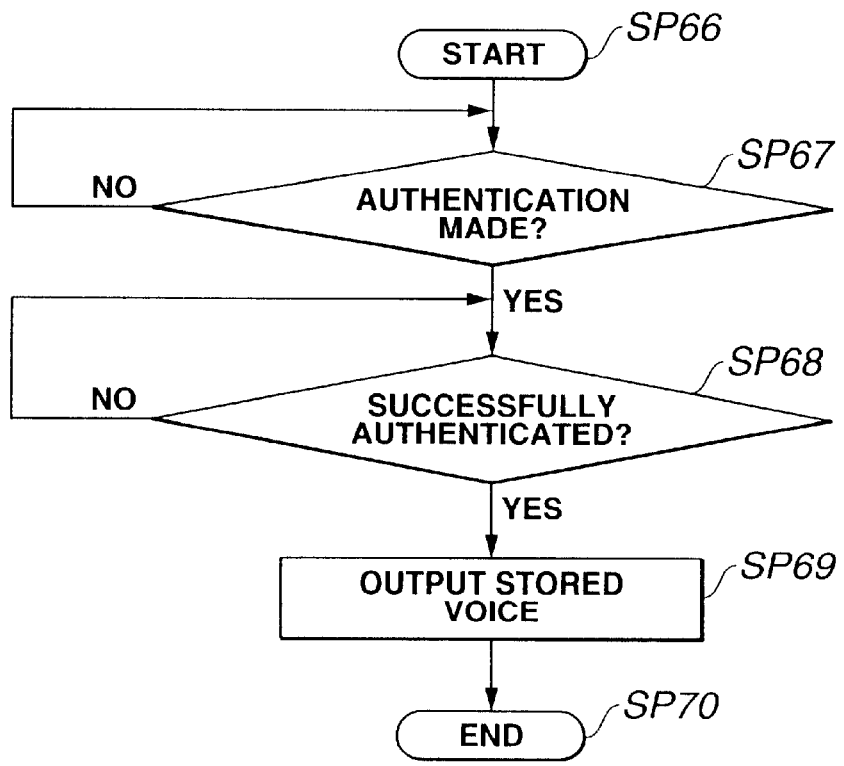
FIG. 12 shows a flow of operations made by the CPU in the main unit of the vehicle positioning system shown in FIG. 10 when the user locates his car in the parking lot.

FIG. 12 shows a flow of operations made by the CPU 68 in a car positioning procedure. When a predetermined control on the terminal unit 64 is operated by the user in step SP66, the CPU 68 moves to step SP67 where it will judge whether fingerprint image data have been entered from the fingerprint input unit 14. If the result of judgment is negative, the CPU 68 repeats the judgment in step SP67. On the other hand, if the result of judgment from step SP67 is affirmative, the CPU 68 moves to step SP68 where it will collate the fingerprint and judge whether the fingerprint image data has come from a living body.

When the user is correctly authenticated to be a registered one, the CPU 68 moves to step SP69. However, if the result of judgment from step SP68 is negative, the CPU 68 returns to step SP67. In step SP69, the CPU 68 loads the sound data recorded in the memory 67 and converts the data from digital to analog to produce sound signals. Further, the CPU 68 drives speaker 69 with the sound signals, and then moves to step SP70 where it will exit the procedure. With the above operations, the CPU 68 informs the user of the user's voices having been recorded at the time of parking his car.

Furthermore, when the user operates the predetermined control, the CPU 68 executes the procedure having previously been described with reference to FIG. 1. Thus, in this embodiment, the user can move to the floor under the guidance by the voice output given via execution of the procedure in FIG. 12 and then operate the terminal unit 64 again for guidance to his car 2 by means of the radio guide wave.

Since the terminal unit 64 roughly guides the user to his car 2 by the sounds, the car positioning system 61 shown in FIG. 10 provides the same effect as the third embodiment.

(5) Fifth Embodiment

Figure 13:
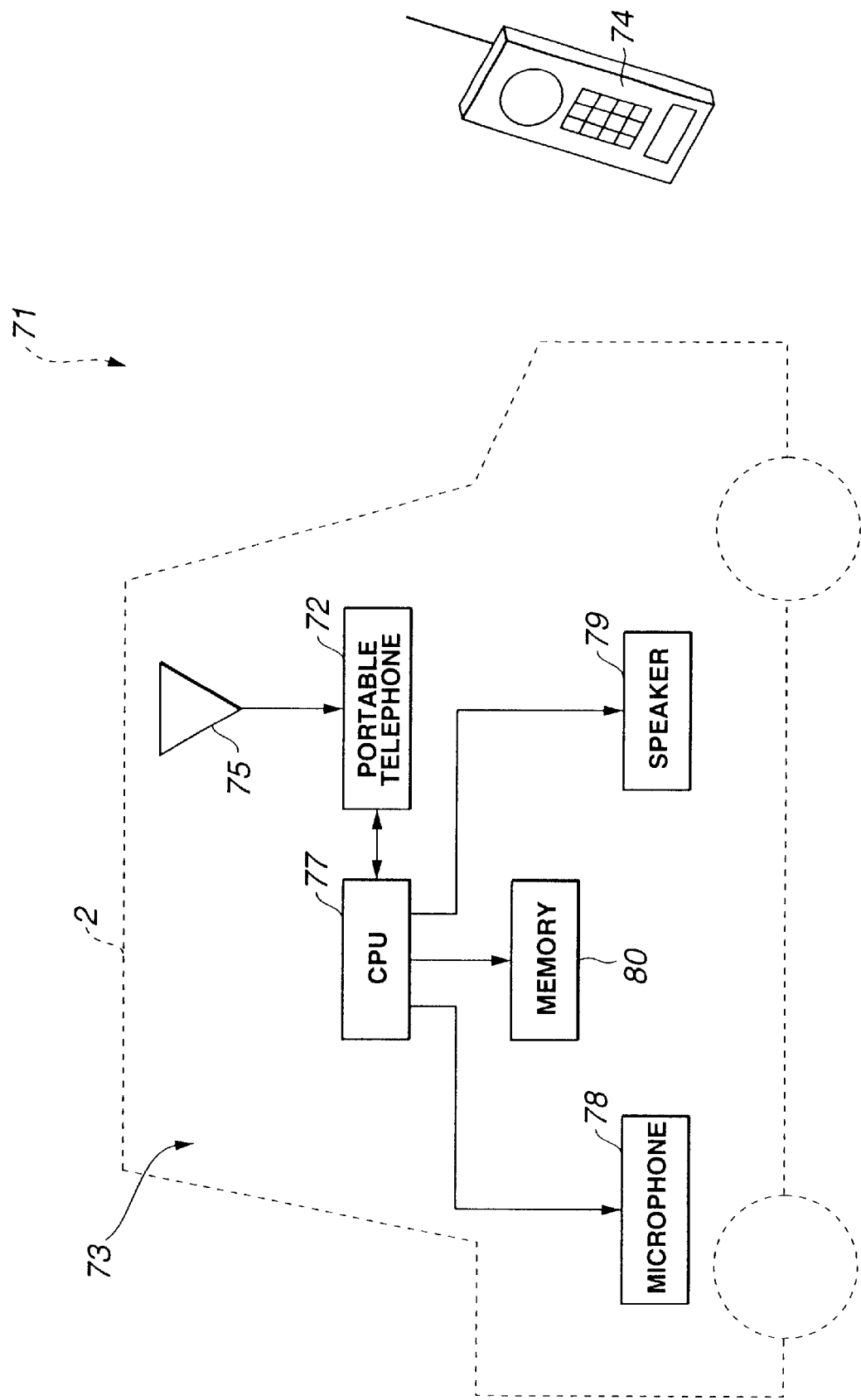
FIG. 13 is a block diagram of the vehicle positioning system according to the fifth aspect of the present invention.

Referring now to FIG. 13, there is schematically illustrated in the form of a block diagram the fifth embodiment of the car positioning system according to the present invention. This car positioning system is generally indicated with a reference 71. Note that in FIG. 13, the same or similar elements as in the first embodiment are indicated with the same references as in FIG. 2 and will not be described any further.

The car positioning system 71 includes a main unit 73 installed on board in the car 2 and a mobile telephone 74 as a terminal unit. The main unit 73 includes a mobile telephone terminal 72, antenna 75, CPU 77, microphone 78, speaker 79 and a memory 80. In response to an access made from the mobile telephone 74, the main unit 73 sends positional information about the car 2 to the mobile telephone 74. More particularly, in the main unit 73, the mobile telephone terminal 72 is connectable to a mobile telephone network via the antenna 75 for access from various mobile telephones. Using the so-called calling number display function of the mobile telephone system, the mobile telephone terminal 72 outputs various data obtained by the mobile telephone 74 to the CPU 77 in response to only an access from a mobile telephone 74 which is exactly the user's one, and outputs various data obtained by the CPU 77 to the mobile telephone 74. Thus, in this car positioning system 71, positional information about the car 2 is sent in response to only an access from the user of the car 2 with reference to the mobile telephone number being an ID code peculiar to each mobile telephone.

In the main unit 73, the microphone 78 picks up and outputs voices of the user, while the speaker 79 outputs sounds synthesized by the CPU 77. The memory 80 is controlled by the CPU 77 to store positional information about the car 2 and various data.

Figure 14:
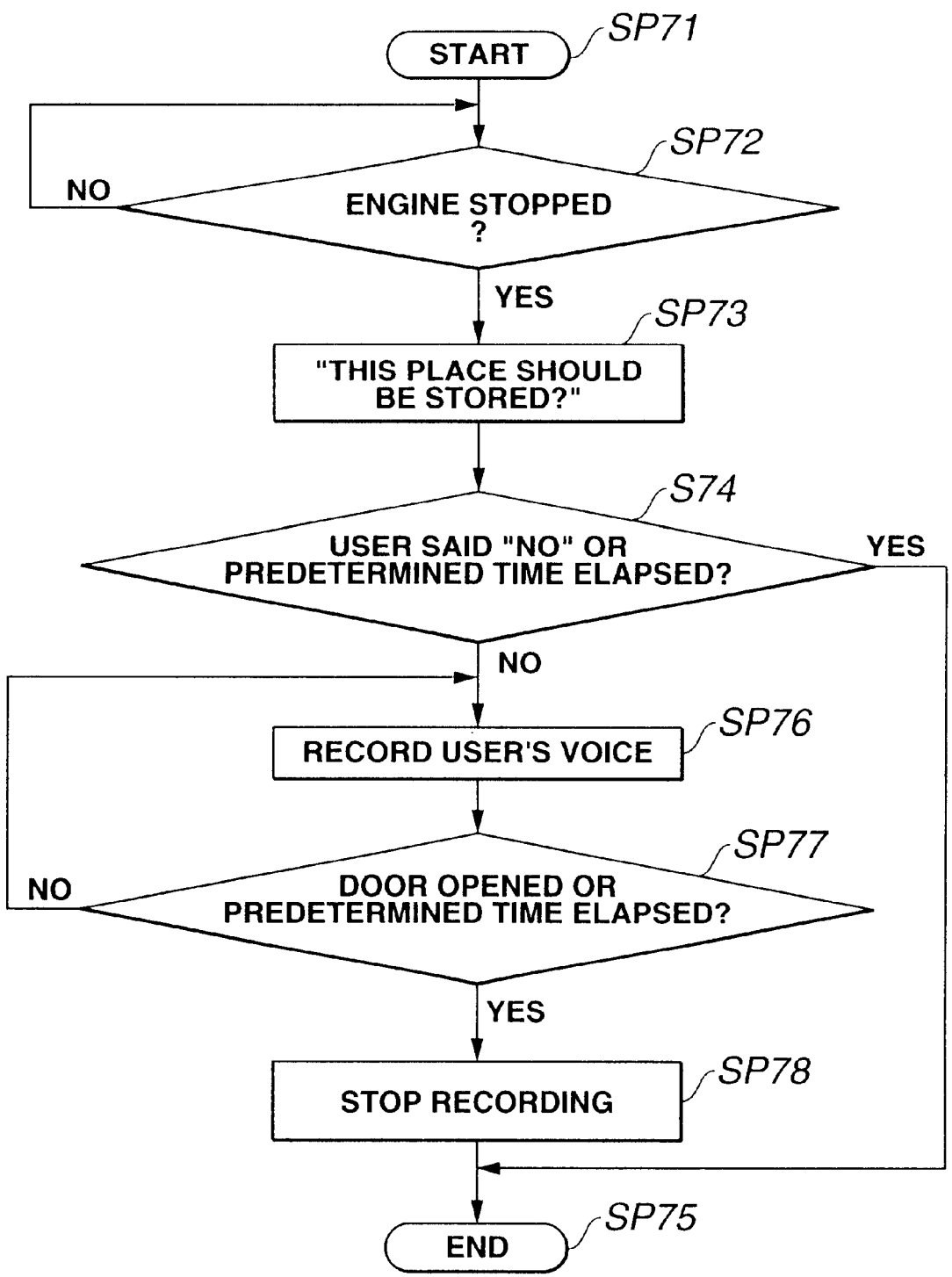
FIG. 14 shows a flow of operations made by a CPU provided in the vehicle positioning system shown in FIG. 13 when the user parks his car in a parking lot.

The CPU 77 controls operations of the main unit 73. It forms a personified information server to serve various kinds of information to the user. Note that the personified information server will be referred to as "agent" hereunder. FIG. 14 shows a flow of operations made by the CPU 77 in a parking procedure. When the car 2 starts running in step SP71, the CPU 77 moves to step SP72 where it will judge whether the user has stopped the engine of his car. If the result of judgment is negative, the CPU 77 repeats the judgment in step SP72.

On the other hand, when the user has parked the car 2, the result of judgment from step SP72 will be affirmative. So the CPU 77 moves from step SP72 to step SP73 where it will drive the speaker 79 to provide synthetic sounds, for example, "This place should be stored?" to he user.

Next the CPU 77 moves to step SP74 where it will recognize the sound signals from the microphone 78 and judge, based on the result of recognition, whether "NO" has been uttered to deny the above question and also whether the user has uttered nothing for more than a predetermined length of time. If the result of judgment is affirmative, the CPU 77 moves to step SP75 where it will exit the procedure.

On the other hand, if the result of judgment from step SP74 is affirmative, the CPU 77 moves to step SP76 where it will convert sound signals successively provided from the microphone 78 from analog to digital and record the data to the memory 80. When the user's voices start being recorded, the CPU 77 moves to step SP77 where it will judge whether the car door has been opened or whether a predetermined time has elapsed after the start of voice recording. If the result of judgment is negative, the CPU 77 repeats the judgment in step SP77. On the other hand, if the result of judgment from step SP77 is affirmative, the CPU 77 moves to step SP78 where it will stop the voice recording and then move to step SP75.

Figure 15:
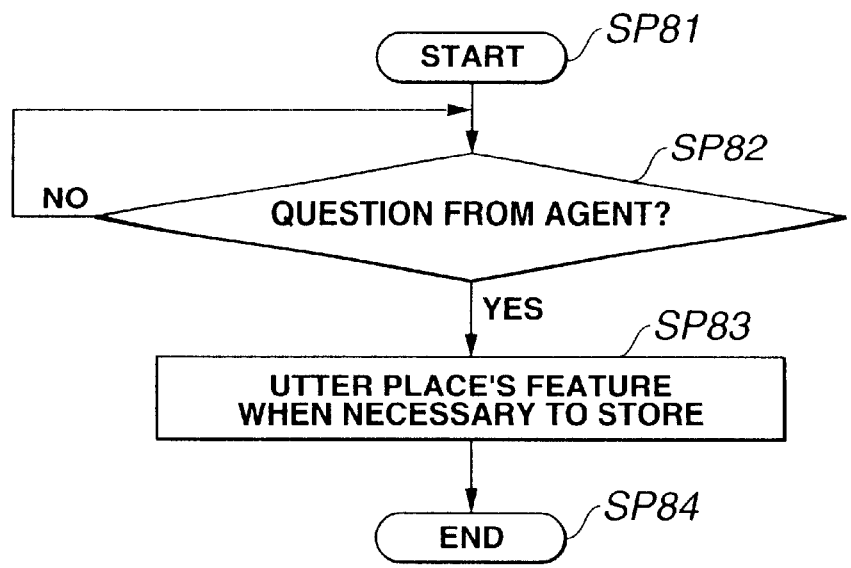
FIG. 15 shows a flow of operations made by the user in the car parking procedure shown in FIG. 14.

Thus, when the user is going to get off the car 2, the main unit 73 makes a question to the user with a speech. If the user responds to the question with an affirmative answer, subsequent user's voices are recorded for a predetermined length of time, and the recorded user's voices are served as positional information about the car 2. Therefore, when the user operates following the procedure shown in FIG. 14 to park the car 2 in step SP81 shown in FIG. 15, the user moves to step SP82 where he will wait for a question from the agent. When he receives a question from the agent, he moves to step SP83 where he will utter his affirmation and feature of the place where he is as necessary, and then moves to step SP84 where he will exit the procedure. Note that the feature of the place used as positional information about the car 2 may be a number assigned to the parking area where the car 2 is parked, for example.

Figure 16:
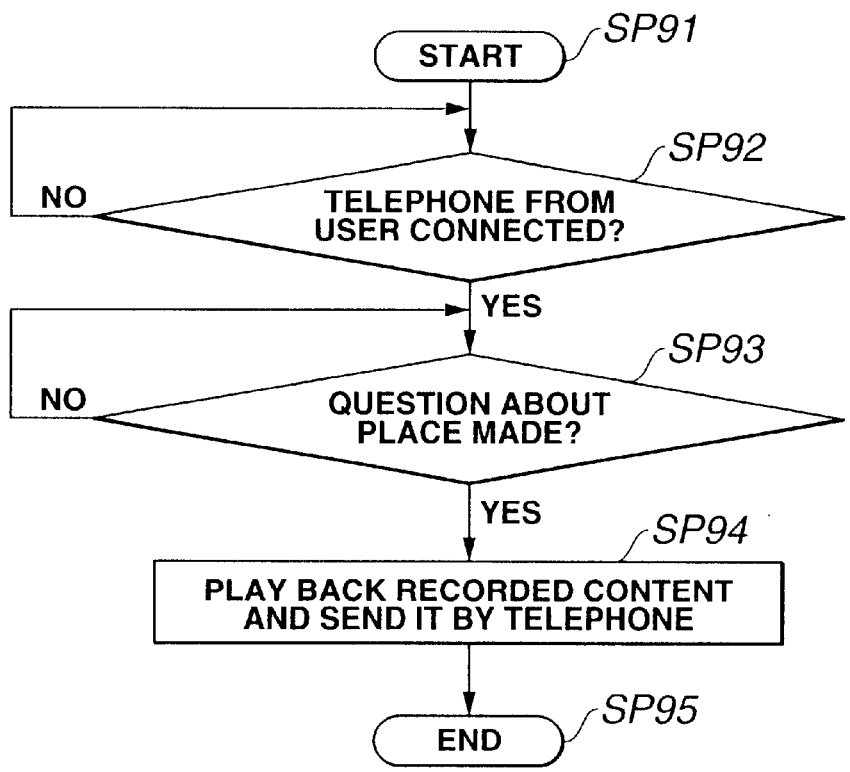
FIG. 16 shows a flow of operations made by the CPU in the vehicle positioning system shown in FIG. 13 when the user locates his car in the parking lot.

FIG. 16 shows a flow of operations made by the CPU 77. This flow is continued from that in FIG. 14. The CPU 77 moves from step SP91 to step SP92 where it will judge whether an access from the mobile telephone 74 of the user has been sent from the mobile telephone terminal 72. If the result of judgment is negative, the CPU 77 repeats the judgment in step SP92.

On the other hand, if the result of judgment from step SP92 is affirmative, the CPU 77 moves to step SP93 where it will recognize the sound data sent from the mobile telephone terminal 72, and judge, based on the result of sound recognition, whether the user has made a question about the parking place. If the result of judgment is negative, the CPU 77 repeats the judgment in step SP93. On the other hand, if the result of judgment is affirmative, the CPU 77 moves to step SP94 where it will serve, to the user, user's voices recorded to the memory 80 at the time of parking the car 2, and then moves to step SP95 where it will exit the procedure. Note that if no affirmative result of judgment can be attained after the CPU 77 has repeated the judgment for more than a predetermined time, the CPU 77 returns to step SP92.

Figure 17:
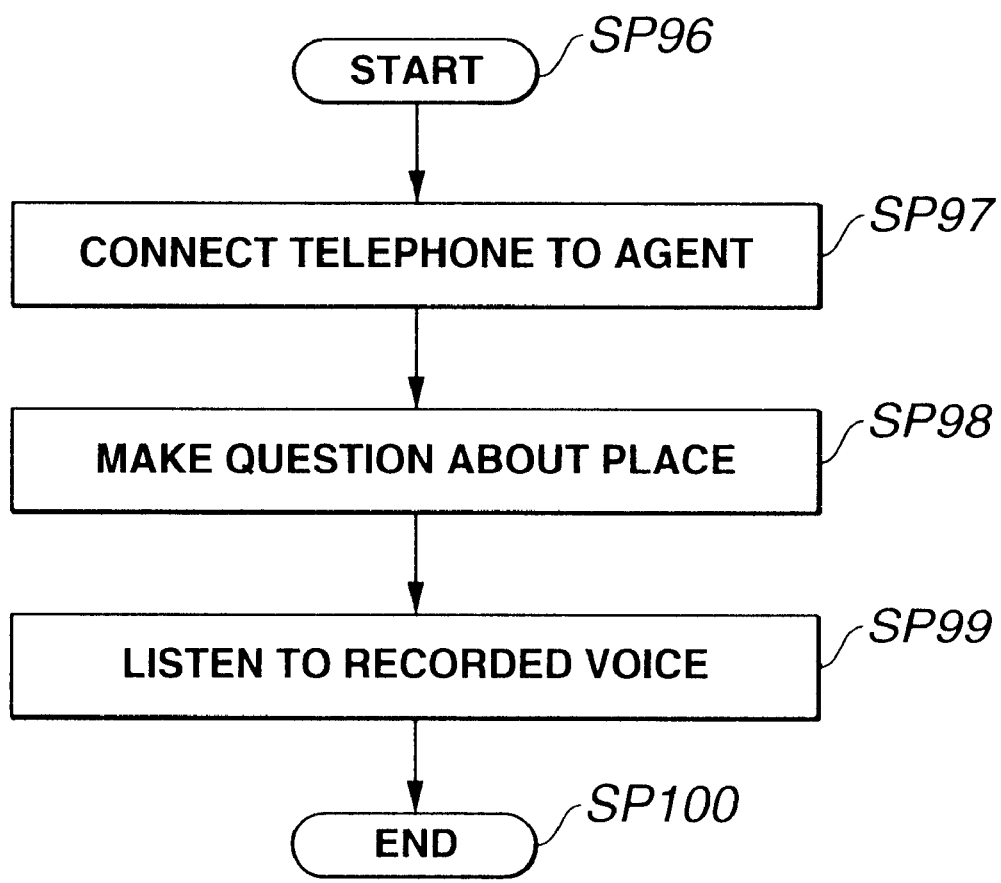
FIG. 17 shows a flow of operations made by the user in the car locating procedure shown in FIG. 16.

Thus, when the user is going back to his car 2 in step SP96 as shown in FIG. 17, he moves to step SP97 where he will make a call to the agent (mobile telephone terminal 72 of the car 2), and then moves to step SP98 where he will utter a message for teaching the parking place. With this utterance, the user can listen to the recorded parking place's feature in step SP99.

The car positioning system 71 is simply constructed, as shown in FIG. 13, to send positional information about the car in consideration in response to an access made, via a public telephone network, from a mobile telephone which is a terminal unit having a peculiar ID code assigned thereto, whereby permitting to easily locate the car with a sufficient security.

Also, by using a highly versatile device such as mobile telephone as the terminal unit, it is possible to lessen the user's burden in carrying on the terminal unit.

(6) Another Embodiment

In the foregoing, the first to fourth embodiments of the car positioning system according to the present invention have been described in which the user is authenticated with a fingerprint. However, the present invention is not limited to the use of a fingerprint authentication but can adopt various methods of user authentication such as authentication such a key-input or user's voice as a password.

Also, in the above-mentioned embodiments, when the user authentication cannot correctly be done, acquisition of positional information is ceased and sending of the positional information to the user is also ceased. However, the present invention is not limited to the above but the positional information may be done independently of any result of user authentication while sending of the positional information is to be ceased only when the user authentication cannot correctly be done.

In the fifth embodiment, the positional information about the car is served in response to an access from the user's mobile telephone. However, the present invention is not limited to the above but in response to such an access from the user's mobile telephone, a user authentication with a password may be done at the main unit or mobile telephone side to serve the positional information.

In the above embodiments, positional information is served by the guide wave and positional information is served including the parking place's feature. However, the present invention is not limited to the above but for example the positioning function of the mobile telephone may be used to acquire and serve the positional information above the car. Thus, various kinds of positional information can be widely used for the purpose of the present invention.

What is claimed is:

1. A vehicle positioning apparatus that is carried by a user, the apparatus comprising:

authentication means for authenticating the user and for providing a result of authentication;

remote controlling means for requesting a predetermined main unit included in the vehicle to send a radio guide wave necessary for finding the vehicle of the user in response to the result of authentification;

receiving means for receiving the radio guide wave necessary for finding the vehicle; and display means for displaying positional information about the vehicle to the user in response to the radio guide wave received by the receiving means, wherein the positional information displayed by the display means includes a direction of emission of the radio guide wave and an intensity level of the radio guide wave.

2. The vehicle positioning apparatus according to claim 1, wherein the authentication means provides the result of authentication based on a unique physical feature of the user.

3. The vehicle Positioning apparatus according to claim 1, wherein the authentication means comprises:

a fingerprint sensor to enter fingerprint data of the user; and processing means for processing the fingerprint data.

4. The vehicle positioning apparatus according to claim 1, further comprising door unlocking means for instructing the main unit to unlock a door of the vehicle of the user based on a result of reception by the receiving means.

5. A vehicle positioning method, comprising the steps of:

authenticating a user by a terminal unit carried by the user and providing a result of authentification;

requesting a predetermined main unit included in the vehicle to send a radio guide wave necessary for positioning the vehicle of the user in response to the result of authentification;

receiving the radio guide wave necessary for positioning the vehicle; and displaying positional information about the vehicle to the user in response to the received radio guide wave, wherein the displayed positional information includes a direction of emission of the radio guide wave and an intensity level of the radio guide wave.

* * * * *